(12) United States Patent
Duale et al.

(10) Patent No.: US 10,574,940 B2
(45) Date of Patent: Feb. 25, 2020

(54) TRAFFIC STOP COMMUNICATIONS SYSTEM

(71) Applicant: INTERNATIONAL BUSINESS MACHINES CORPORATION, Armonk, NY (US)

(72) Inventors: Ali Y. Duale, Poughkeepsie, NY (US); Shailesh R. Gami, Poughkeepsie, NY (US); Arkadiy O. Tsfasman, Wappingers Falls, NY (US); John S. Werner, Fishkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/798,435

(22) Filed: Oct. 31, 2017

(65) Prior Publication Data

US 2019/0132548 A1 May 2, 2019

(51) Int. Cl.
*H04N 7/14* (2006.01)
*G06Q 50/26* (2012.01)
*H04N 7/15* (2006.01)
*H04L 29/06* (2006.01)
*H04L 29/08* (2006.01)
*G06K 9/00* (2006.01)

(52) U.S. Cl.
CPC ............ *H04N 7/147* (2013.01); *G06Q 50/26* (2013.01); *H04L 65/1069* (2013.01); *H04L 65/403* (2013.01); *H04L 65/4076* (2013.01); *H04N 7/155* (2013.01); *G06K 9/00288* (2013.01); *H04L 67/12* (2013.01)

(58) Field of Classification Search
CPC combination set(s) only.
See application file for complete search history.

(56) References Cited

U.S. PATENT DOCUMENTS

| | | | |
|---|---|---|---|
| 6,518,881 | B2 | 2/2003 | Monroe |
| 6,728,338 | B1 | 4/2004 | Kampmeier et al. |
| 6,943,703 | B2 | 9/2005 | Rubenstein |
| 9,024,783 | B1 | 5/2015 | Alfaro |

(Continued)

OTHER PUBLICATIONS

Atallah et al.; "Modeling of Multi-Hop Inter-Vehicular Path Formation for Connecting Far Vehicles to RSUs"; CConference: IEEE Wireless Communications and Networking Conference (WCNC'15) 2015; pp. 1-6.

(Continued)

*Primary Examiner* — Phung-Hoang J Nguyen
(74) *Attorney, Agent, or Firm* — Cantor Colburn LLP; Teddi Maranzano

(57) ABSTRACT

Embodiments include methods, systems and computer program products for minimizing face-to-face interaction for law enforcement officers during traffic stops. Aspects include broadcasting, by a law enforcement device, a request to initiate a secure communication channel with a driver device and receiving by the law enforcement device, a notification that the driver device has accepted the request. Aspects also include initiating a video conference between the law enforcement device and the driver device over the secure communication channel and transferring, between the driver device and the law enforcement device, one or more documents over the secure communication channel.

16 Claims, 6 Drawing Sheets

(56) References Cited

U.S. PATENT DOCUMENTS

| | | | |
|---|---|---|---|
| 9,305,323 B2 | 4/2016 | Alazraki et al. | |
| 9,641,965 B1 | 5/2017 | Rapp et al. | |
| 9,779,452 B1* | 10/2017 | Medina | G06Q 20/1085 |
| 2006/0026433 A1* | 2/2006 | Montenegro | G06F 21/31 |
| | | | 713/181 |
| 2009/0062008 A1* | 3/2009 | Karmarkar | G07F 17/32 |
| | | | 463/42 |
| 2009/0226001 A1* | 9/2009 | Grigsby | G08G 1/0962 |
| | | | 381/77 |
| 2011/0116480 A1* | 5/2011 | Li | H04W 28/04 |
| | | | 370/332 |
| 2015/0161888 A1 | 6/2015 | Kim | |
| 2015/0334345 A1 | 11/2015 | Fichera | |
| 2016/0173950 A1* | 6/2016 | Brown, Jr. | G08B 13/196 |
| | | | 725/116 |
| 2016/0180166 A1* | 6/2016 | Egan | G06Q 20/208 |
| | | | 358/462 |
| 2016/0294831 A1 | 10/2016 | Borunda et al. | |
| 2017/0132927 A1 | 5/2017 | Zlojutro | |
| 2017/0180457 A1 | 6/2017 | Harpole et al. | |
| 2017/0364977 A1* | 12/2017 | Chen | G06Q 10/10 |
| 2018/0012324 A1* | 1/2018 | Kelts | G06Q 50/265 |
| 2018/0018831 A1* | 1/2018 | Thorpe | G06Q 10/10 |
| 2018/0035476 A1* | 2/2018 | Lofton | H04W 4/80 |
| 2018/0053225 A1* | 2/2018 | Siminoff | G06Q 30/0277 |

OTHER PUBLICATIONS

Campuzano Andres J. et al., "Vehicular-to-Vehicular Channel Characterization and Measurement Results"; Waves—2012—year 4/ISSN 1889-8297; pp. 15-24.

Hutchins, Thomas "In-Car Cameras: Executive Summary"; IACP/COPS Technology Technical Assistance Program; prior to Oct. 9, 2017; www.theiacp.org/portals/0/pdfs/InCarCamera.pdf; cover page; pp. 46-132.

Melnyk, Pavlo, Thesiss "Mobile Digital Video System for Law Enforcement", Master of Science in Electrical Engineering; May 2003; Submitted to the University of New Hampshire; 110 pgs.

* cited by examiner

TRAFFIC STOP COMMUNICATIONS SYSTEM

BACKGROUND

The present disclosure relates to communication between law enforcement officers and citizens and more specifically to minimizing face-to-face interaction for law enforcement officers during traffic stops.

In general, traffic stops can be stressful and potentially dangerous for both law enforcement officers and for drivers because law enforcement officers do not know who or what they are going to see when they approach a vehicle. Likewise, a driver may be on edge and unsure of how the law enforcement officer may react when reaching the vehicle (i.e., state of mind of the law enforcement officer). Statistically, traffic stops are one of the most dangerous situations that law enforcement officers encounter. In addition to potential danger posed by the driver or passengers of a vehicle, law enforcement officers face danger by exiting their vehicle on busy roads.

SUMMARY

In accordance with an embodiment, a method for minimizing face-to-face interaction for law enforcement officers during traffic stops is provided. The method includes broadcasting, by a law enforcement device, a request to initiate a secure communication channel with a driver device. The method also includes receiving, by the law enforcement device, a notification that the driver device has accepted the request. The method further includes initiating a video conference between the law enforcement device and the driver device over the secure communication channel. The method also includes transferring, between the driver device and the law enforcement device, one or more documents over the secure communication channel.

In accordance with another embodiment, a communication system configured to minimize face-to-face interaction for law enforcement officers during traffic stops, the communication system includes a law enforcement device having a processor in communication with one or more types of memory. The processor configured to broadcast a request to initiate a secure communication channel with a driver device and to receive a notification that the driver device has accepted the request. The processor is also configured to initiate a video conference between the law enforcement device and the driver device over the secure communication channel. The processor is further configured to transfer one or more documents between the driver device and the law enforcement device over the secure communication channel.

In accordance with a further embodiment, a computer program product for minimizing face-to-face interaction for law enforcement officers during traffic stops includes a non-transitory storage medium readable by a processing circuit and storing instructions for execution by the processing circuit for performing a method. The method includes broadcasting, by a law enforcement device, a request to initiate a secure communication channel with a driver device. The method also includes receiving, by the law enforcement device, a notification that the driver device has accepted the request. The method further includes initiating a video conference between the law enforcement device and the driver device over the secure communication channel. The method also includes transferring, between the driver device and the law enforcement device, one or more documents over the secure communication channel.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
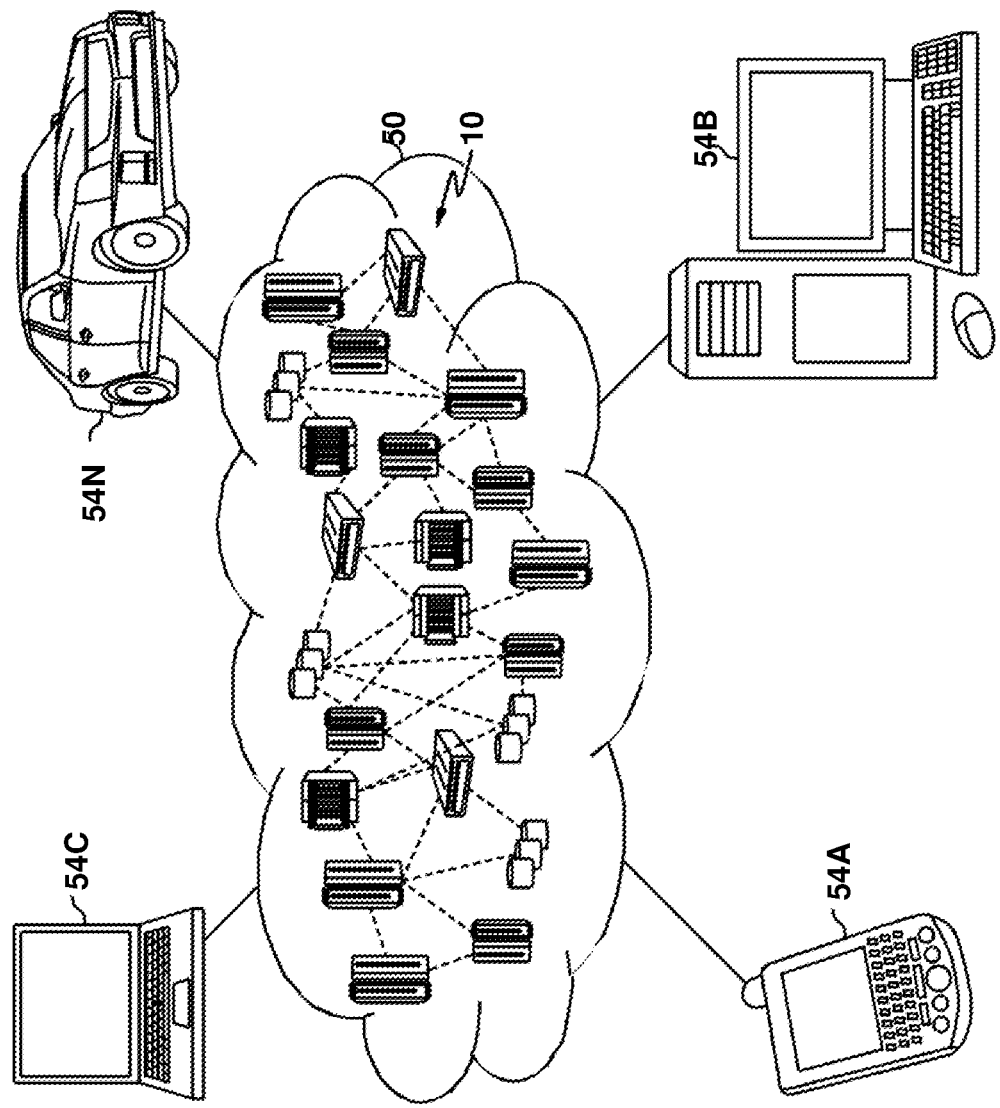
FIG. 1 depicts a cloud computing environment according to one or more embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
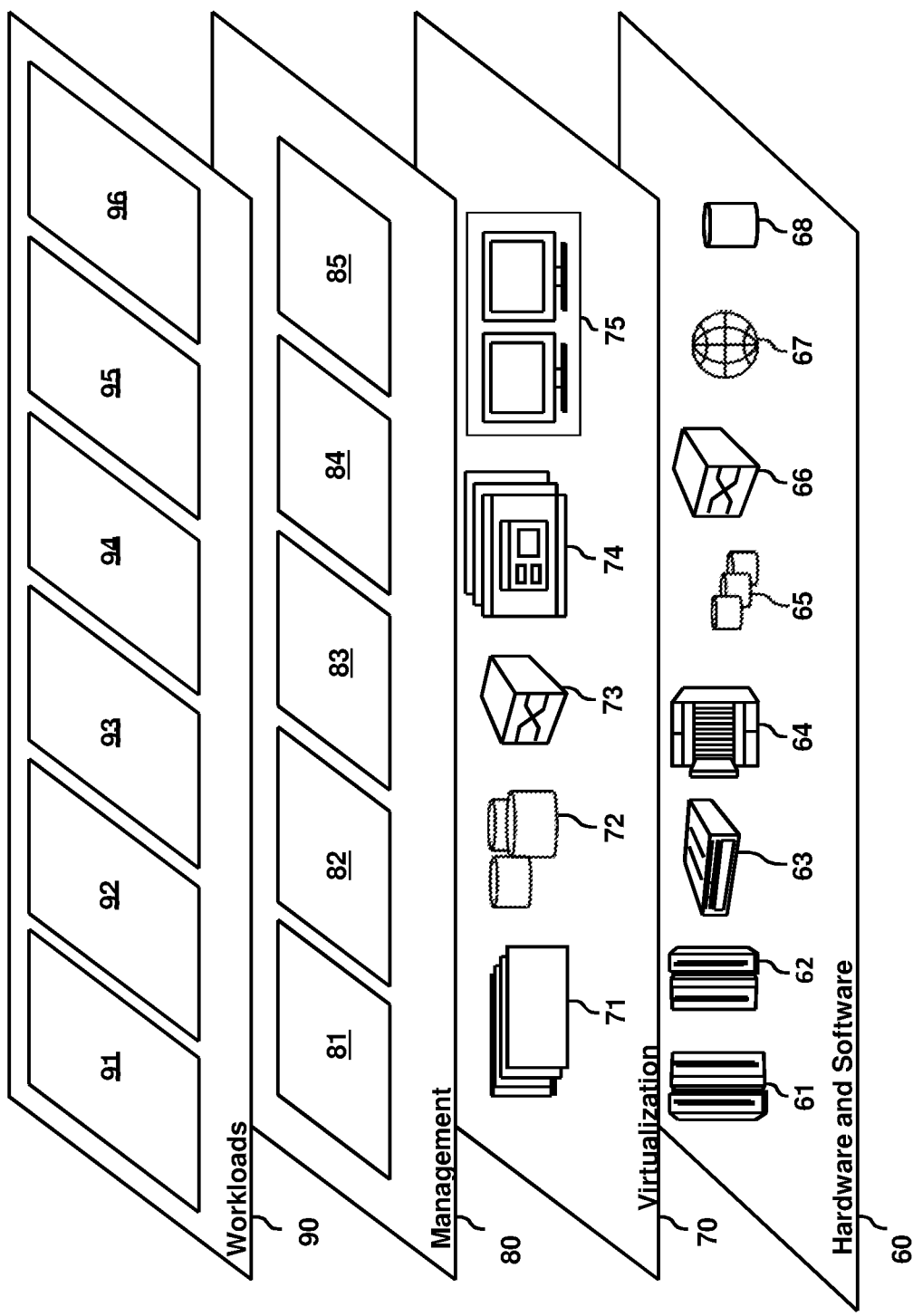
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and communication systems 96.

Figure 3:
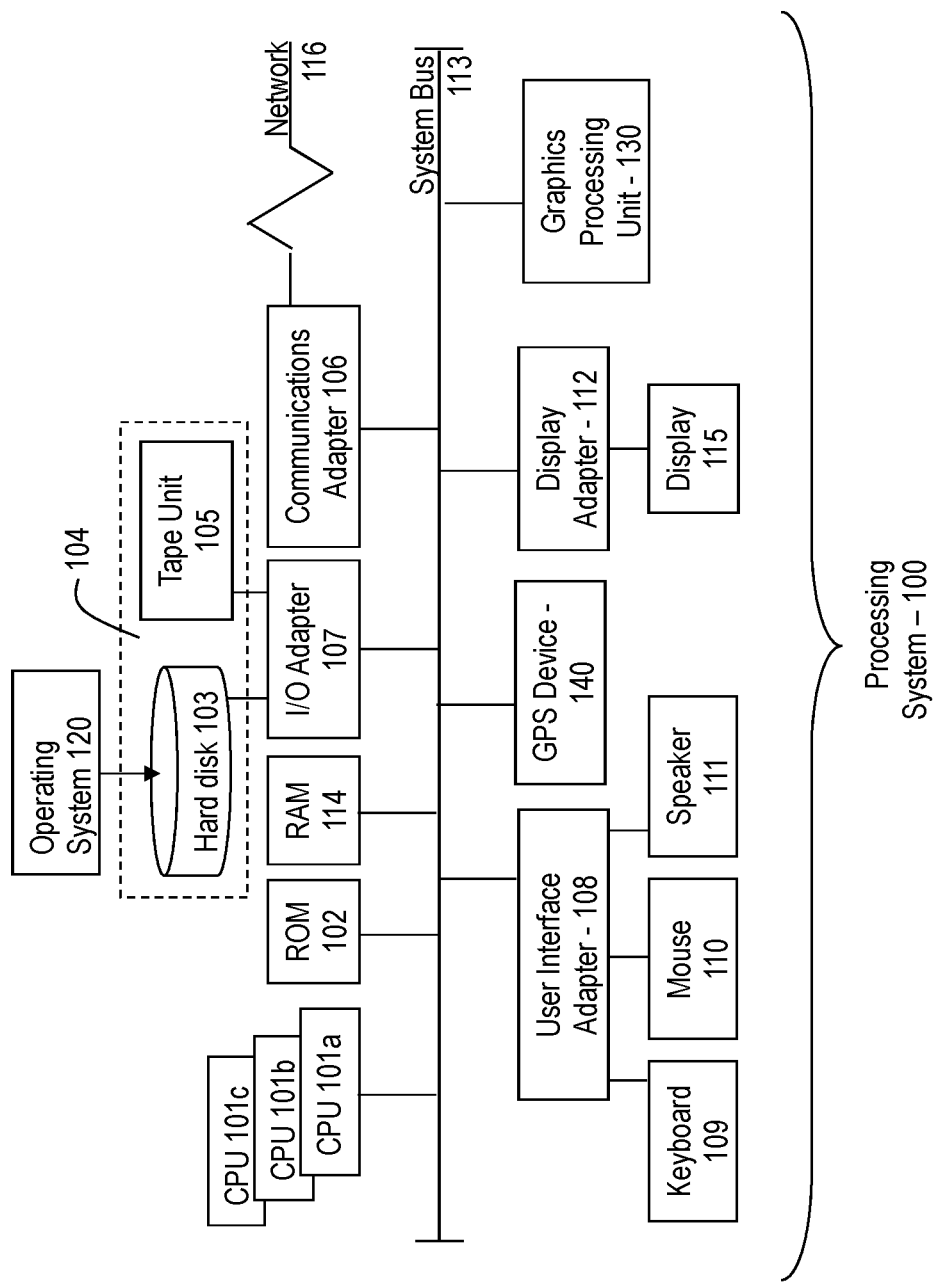
FIG. 3 is a block diagram of an exemplary computer system capable of implementing one or more embodiments of the present invention.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read-only memory (ROM) 102 is coupled to the system bus 113 and may include a basic input/output system (BIOS), which controls certain basic functions of system 100.

FIG. 3 further depicts an input/output (I/O) adapter 107, a network adapter 106, and a GPS device 140 coupled to the system bus 113. I/O adapter 107 may be a small computer system interface (SCSI) adapter that communicates with flash storage, a hard disk 103 and/or tape storage drive 105 or any other similar component. I/O adapter 107, flash storage, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

Turning now to an overview of technologies that are more specifically relevant to aspects of the invention, which are related to minimizing face-to-face interaction for law enforcement officers during traffic stops. In exemplary embodiments, law enforcement officers utilize a communication system to securely communicate with the driver of a vehicle that is the subject of a traffic stop. The communication system allows the law enforcement officer and the driver to participate in a video conference and to exchange documents such as insurance cards, driver licenses, citations, and the like. Accordingly, the law enforcement officer may not have to exit the vehicle onto a busy road to perform routine communication tasks with the driver. Likewise, the driver may feel safer by not having an unknown person with a weapon approaching their vehicle.

Figure 4:
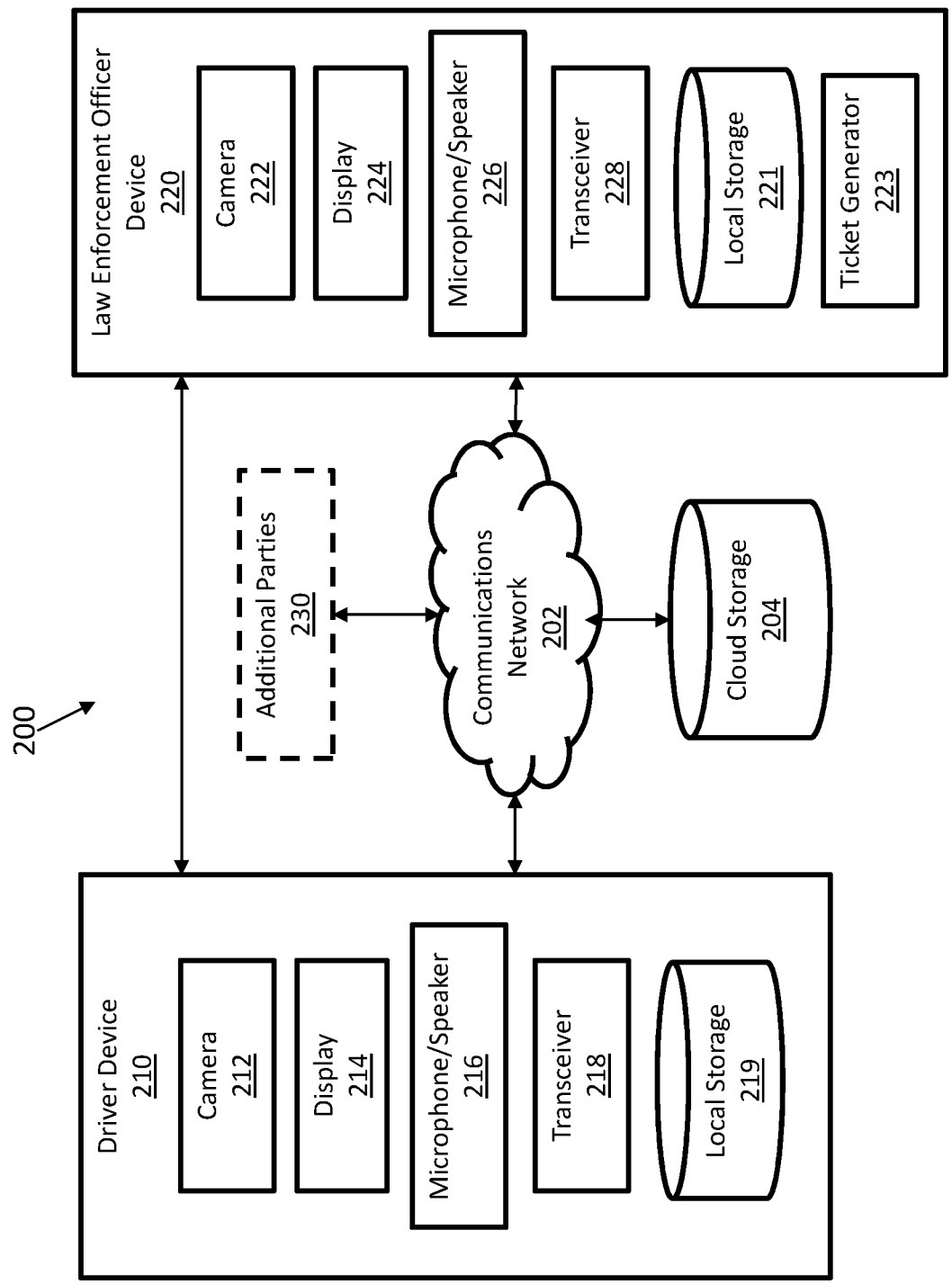
FIG. 4 is a block diagram of a system for minimizing face-to-face interaction for law enforcement officers during traffic stops in accordance with an exemplary embodiment.

Referring now to FIG. 4, a system 200 for minimizing face-to-face interaction for law enforcement officers during traffic stops is shown. As illustrated the system 200 includes a driver device 210 that is in communication with a law enforcement officer device 220. In exemplary embodiments, the driver device 210 can be a built into a vehicle or it may be a smartphone disposed within a vehicle. Likewise, the law enforcement officer device 220 can be a built into a law enforcement vehicle or it may be a smartphone or a special use device disposed within a law enforcement vehicle. The driver device 210 and the law enforcement officer device 220 are configured to communicate with one another either directly or via a communications network 202. The driver device 210 and/or the law enforcement officer device 220, may be a processing system such as the one shown in FIG. 3. The communications network 202 can include both private and public communications networks such as cellular telephone networks, and the Internet. The communications network 202 can be used to connect one or more additional parties 230 to the communication between the driver device 210 and the law enforcement officer device 220.

In exemplary embodiments, the driver device 210 includes a camera 212, a display 214, and a microphone/speaker 216 that are used to facilitate a text, an audio and/or video conference between the driver and a law enforcement officer. The driver device 210 also includes a transceiver 218 to facilitate communication with the law enforcement officer device 220, either directly or via the communications network 202. In addition, the driver device 210 includes a local storage device 219 that can be used to store copies of audio/video conferences held with law enforcement officers, copies of the documentation provided by drivers, and copies of tickets received from law enforcement officers. In exemplary embodiments, this information can also be stored in cloud storage 204 in addition to, or in place of, the local storage 219.

In exemplary embodiments, the law enforcement officer device 220 includes a camera 222, a display 224, and a microphone/speaker 226 that are used to facilitate a text, an audio and/or video conference between the driver and a law enforcement officer. The law enforcement officer device 220 also includes a transceiver 228 to facilitate communication with the driver device 210, either directly or via the communications network 202. In addition, the law enforcement officer device 220 includes a local storage device 221 that can be used to store copies of text/audio/video conferences held with drivers, copies of the documentation provided by drivers, and copies of tickets created by the law enforcement officers. In exemplary embodiments, this information can also be stored in cloud storage 204 in addition to, or in place of, the local storage 221. The law enforcement officer device 220 also includes a ticket generator 223 that can be used by the law enforcement officer to create an electronic ticket, which can be transmitted to the driver device 210 via the transceiver 228.

Figure 5:
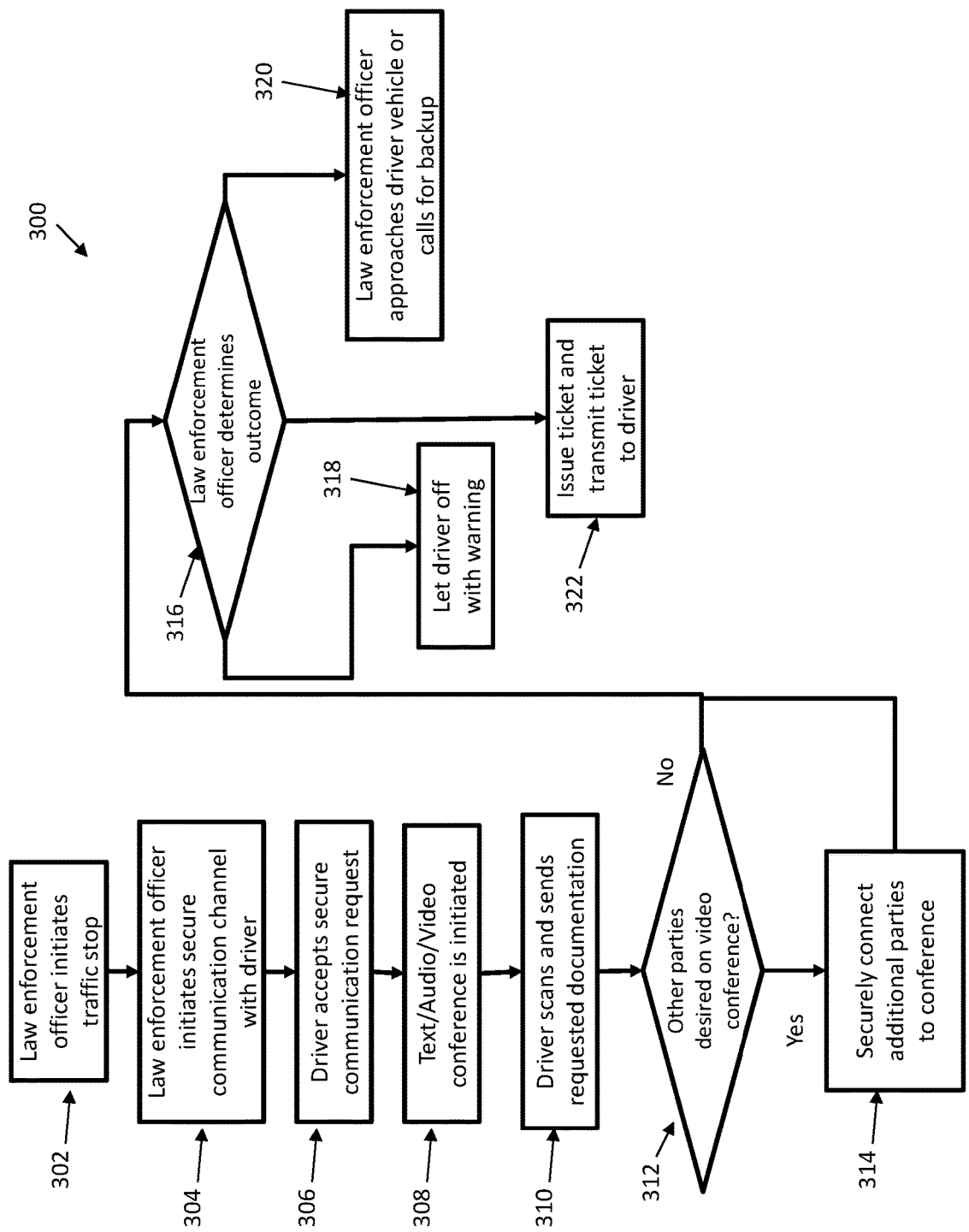
FIG. 5 is a flow diagram of a method for minimizing face-to-face interaction for law enforcement officers during traffic stops in accordance with an exemplary embodiment.

Referring now to FIG. 5, a flow diagram is shown of a method 300 for minimizing face-to-face interaction for law enforcement officers during traffic stops in accordance with an exemplary embodiment. As shown at block 302, the method 300 includes a law enforcement officer initiating a traffic stop of a driver of a vehicle. Next, as shown at block 304, the method 300 includes the law enforcement officer initiating a secure communication channel with the driver. In exemplary embodiments, the law enforcement officer device can broadcast a message that includes the request to initiate the secure communication channel. The request can be broadcast in a manner such that only the vehicle stopped directly in front of law enforcement vehicle will receive the broadcast using a short-range network (e.g., short range Wi-Fi, Bluetooth, etc.). Next, as shown at block 306, the method 300 includes the driver accepting secure communication request. Once a connection is established the law enforcement officer may verify that they have indeed made a connection with the pulled over driver. In the event that a connection was made with a device other than that of the pulled over driver, the law enforcement officer may block the connected device and rebroadcast a request for a secure communication channel. The method 300 also includes initiating a text, an audio and/or video conference between the driver and the law enforcement officer, as shown at block 308.

In exemplary embodiments, during the video conference between the law enforcement officer and the driver, the law enforcement officer may request that the driver provide some documentation, such as an insurance card, a driver's license, or a vehicle registration. The method 300 also includes the driver scanning and transmitting the requested documentation to the law enforcement officer via the secure communication channel, as shown at block 310. The scanning device may be part of the vehicle that requires the user to physically insert the requested documentation, the driver may provide a picture via their mobile device, or the driver may have electronic versions of the requested documentation stored on local storage 219. In exemplary embodiments, as shown at decision block 312, the method 300 can include determining if either the driver or the law enforcement officer would like to add additional parties to the video conference. For example, a minor driver may wish to add their parent to the video conference, a driver may wish to add their attorney to the video conference, the law enforcement officer may wish to add a colleague with special training to the video conference, and the like. Next, as shown at block 314, one or more additional parties can be connected to the video conference if desired.

As shown at decision block 316, the method 300 includes the law enforcement officer determining the outcome of the traffic stop. The law enforcement officer may determine to let the driver off with a warning, as shown at block 318. The law enforcement officer may decide to approach the vehicle or call for backup, as shown at block 320. Alternatively, the law enforcement officer may decide to issue and electronically transmit a ticket to the driver of the vehicle, as shown at block 322.

Figure 6:
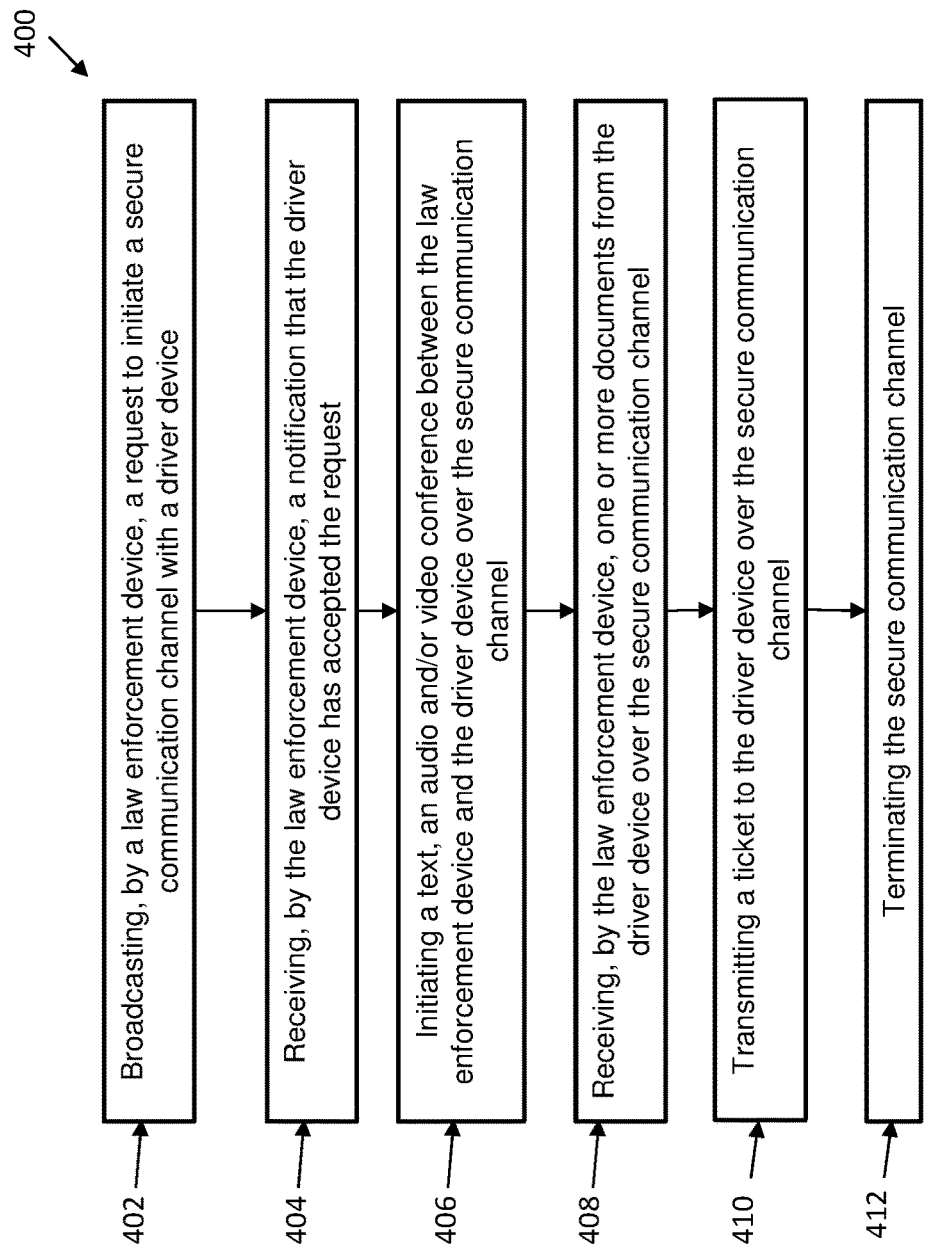
FIG. 6 is a flow diagram of another method for minimizing face-to-face interaction for law enforcement officers during traffic stops in accordance with an exemplary embodiment.

Referring now to FIG. 6, a flow diagram of a method 400 for minimizing face-to-face interaction for law enforcement officers during traffic stops in accordance with an exemplary embodiment. As shown at block 402, the method 400 includes broadcasting, by a law enforcement device, a request to initiate a secure communication channel with a driver device. Next, as shown at block 404, the method 400 includes receiving, by the law enforcement device, a notification that the driver device has accepted the request. In exemplary embodiments, the law enforcement officer will then verify that the correct vehicle is connected to the secure communication channel before closing off the signal to all others except for the driver which establishes the secure communication channel. In exemplary embodiments, the law enforcement officer has the ability to reject a connection if someone other than the pulled over driver attempts to connect to the secure communication channel. For example, if the traffic stop occurs in an area where there is traffic or the pulled over driver is near a stop sign, red light, bus stop, etc. Likewise, the law enforcement officer could also choose to block connection from the same user for a short period of time after rejection so that the rejected connector does not continuously attempt to reconnect.

Continuing with reference to FIG. 6, the method 400 also includes initiating a video conference between the law enforcement device and the driver device over the secure communication channel at block 406. In exemplary embodiments, during the video conference the law enforcement officer can verify that the driver matches the exchanged documents and is indeed seated in the driver's seat. In addition, during the video conference the law enforcement officer can visually see the driver and monitor their speech to determine if the driver may be impaired (e.g., alcohol, drugs, etc.). Furthermore, during the video conference the law enforcement officer can request that the driver provide the law enforcement officer with requested documentation, such as vehicle registration, driver license, or the like. As shown at block, 408, the method 400 includes receiving, by the law enforcement device, one or more documents from the driver device over the secure communication channel.

In exemplary embodiments, the driver device could contain a place to swipe or scan documents. For example, the driver device can include a camera that is used to capture an image of a document or a scanner that is configured to scan a barcode on a document, such as a driver license. In another example, the driver device can include a chip reader and/or that is configured to scan a document, or identification card, that includes an integrated circuit chip, barcode, QR code, or the like.

Once, the law enforcement officer receives the documents from the driver device, the law enforcement officer can review the documents and decide how to proceed with the traffic stop, i.e., issue a warning, issue a citation, approach the vehicle, call for backup, or the like. In exemplary embodiments, the law enforcement officer's review of the documents can include using a processing system to perform facial recognition comparison of the operator of the vehicle stopped, which can be captured from the video conference, with an image obtained from the provided documentation, i.e., a driver license.

In exemplary embodiments, the law enforcement officer can obtain records of an individual/vehicle from a variety of sources available to the law enforcement officer. Such records can include, but are not limited to, criminal history, motor vehicle records, outstanding warrants, and the like. The law enforcement officer can use this information to assist them in determining how to proceed with the traffic stop. In addition, the law enforcement officer can obtain and watch previously captured video conference videos that involve either the driver and or the vehicle that was stopped. The law enforcement officer can use these videos to obtain a better understanding of the individual's patterns of behavior. For example, if the driver happens to be a repeat offender, the law enforcement officers can view these videos to get a better understanding of what happened previously or to see if similar excuses are used in an attempt to get out of receiving a ticket.

Once, the law enforcement officer has determined that a citation, or ticket, is going to be issued to the driver as a result of the traffic stop, the law enforcement officer can electronically transmit the ticket to the driver of the vehicle. In exemplary embodiments, the ticket can be transmitted to the driver device over the secure communication channel, as shown at block 410. In other embodiments, the law enforcement officer can send the ticket to the driver via another form of communication as well (e.g., email, text, a hyperlink to state traffic violation database, etc.). At the conclusion of the traffic stop, the secure communication channel is terminated, as shown at block 412. In exemplary embodiments, the video conference can be stored locally on the law enforcement device and/or the driver device and it can be stored in a cloud storage server. In addition, the driver can request that a copy of the video conference, or a link to it, can be sent to the driver via email, text or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for minimizing face-to-face interaction for a law enforcement officer during a traffic stop of a vehicle, the computer implemented method comprises:
   broadcasting, by a law enforcement device that is built into a law enforcement vehicle, a request to initiate a secure communication channel with a driver device;
   receiving, by the law enforcement device, a notification that the driver device has accepted the request;
   initiating a video conference between the law enforcement device and the driver device over the secure communication channel;
   transferring, between the driver device and the law enforcement device, one or more documents over the secure communication channel, wherein the one or more documents includes an image of a drivers license of a driver of the vehicle;
   obtaining, based on data from the drivers license, one or more previously recorded video conferences of the driver of the vehicle and law enforcement officers, a criminal history of the drive, and motor vehicle records of the vehicle; and
   playing, by the law enforcement device, the one or more previously recorded video conferences, wherein the one or more previously recorded videos, the criminal history and the motor vehicle records are used by the law enforcement officer to determine whether the driver is a repeat offender.

2. The computer implemented method of claim 1, further comprising transmitting a ticket to the driver device over the secure communication channel.

3. The computer implemented method of claim 1, further comprising terminating the secure communication channel at a conclusion of a traffic stop.

4. The computer implemented method of claim 1, further comprising performing a facial recognition comparison of the driver of the vehicle captured during the video conference with an image obtained from the drivers license.

5. The computer implemented method of claim 1, further comprising storing a copy of the video conference between the law enforcement device and the driver device.

6. The computer implemented method of claim 1, further comprising inviting an additional party to the video conference over the secure communication channel by one of the law enforcement officer and a driver of the vehicle.

7. The computer implemented method of claim 1, further comprising rejecting a connection to the secure communication channel received from a device other than the driver device, wherein rejecting blocks said device from attempting to reconnect to the secure communication channel for a time period.

8. A non-transitory computer readable storage medium for minimizing face-to-face interaction for law enforcement officers during traffic stops having instructions for execution by the processing circuit for performing a method comprising:
   broadcasting, by a law enforcement device that is built into a law enforcement vehicle, a request to initiate a secure communication channel with a driver device;
   receiving, by the law enforcement device, a notification that the driver device has accepted the request;
   initiating a video conference between the law enforcement device and the driver device over the secure communication channel;
   transferring, between the driver device and the law enforcement device, one or more documents over the secure communication channel, wherein the one or more documents includes an image of a drivers license of a driver of the vehicle;
   obtaining, based on data from the drivers license, one or more previously recorded video conferences of the driver of the vehicle and law enforcement officers, a criminal history of the drive, and motor vehicle records of the vehicle; and
   playing, by the law enforcement device, the one or more previously recorded video conferences, wherein the one or more previously recorded videos, the criminal history and the motor vehicle records are used by the law enforcement officer to determine whether the driver is a repeat offender.

9. The non-transitory computer readable storage medium of claim 8, wherein the method further comprises transmitting a ticket to the driver device over the secure communication channel.

10. The non-transitory computer readable storage medium of claim 8, wherein the method further comprises terminating the secure communication channel at a conclusion of a traffic stop.

11. The non-transitory computer readable storage medium of claim 8, wherein the method further comprises performing a facial recognition comparison of the driver of a vehicle captured during the video conference with an image obtained from the drivers license.

12. The non-transitory computer readable storage medium of claim 8, wherein the method further comprises storing a copy of the video conference between the law enforcement device and the driver device.

13. A law enforcement vehicle having a communication system configured to minimize face-to-face interaction for law enforcement officers during traffic stops, the communication system comprising a law enforcement device having a processor in communication with one or more types of memory, the processor configured to:
  broadcast a request to initiate a secure communication channel with a driver device; receive a notification that the driver device has accepted the request;
  initiate a video conference between the law enforcement device and the driver device over the secure communication channel;
  transfer one or more documents between the driver device and the law enforcement device over the secure communication channel, wherein the one or more documents includes an image of a drivers license of a driver of the vehicle;
  obtaining, based on data from the drivers license, one or more previously recorded video conferences of the driver of the vehicle and law enforcement officers, a criminal history of the drive, and motor vehicle records of the vehicle; and
  playing, by the law enforcement device, the one or more previously recorded video conferences, wherein the one or more previously recorded videos, the criminal history and the motor vehicle records are used by the law enforcement officer to determine whether the driver is a repeat offender.

14. The law enforcement vehicle of claim 13, wherein the processor is further configured to transmit a ticket to the driver device over the secure communication channel.

15. The law enforcement vehicle of claim 13, wherein the processor is further configured to terminate the secure communication channel at a conclusion of a traffic stop.

16. The computer implemented method of claim 6, wherein the additional party is an attorney of the driver of the vehicle.

* * * * *